July 18, 1939.  H. A. WINTERMUTE  2,166,385
DETERMINING ELECTRICAL CHARACTERISTICS
Filed April 10, 1937
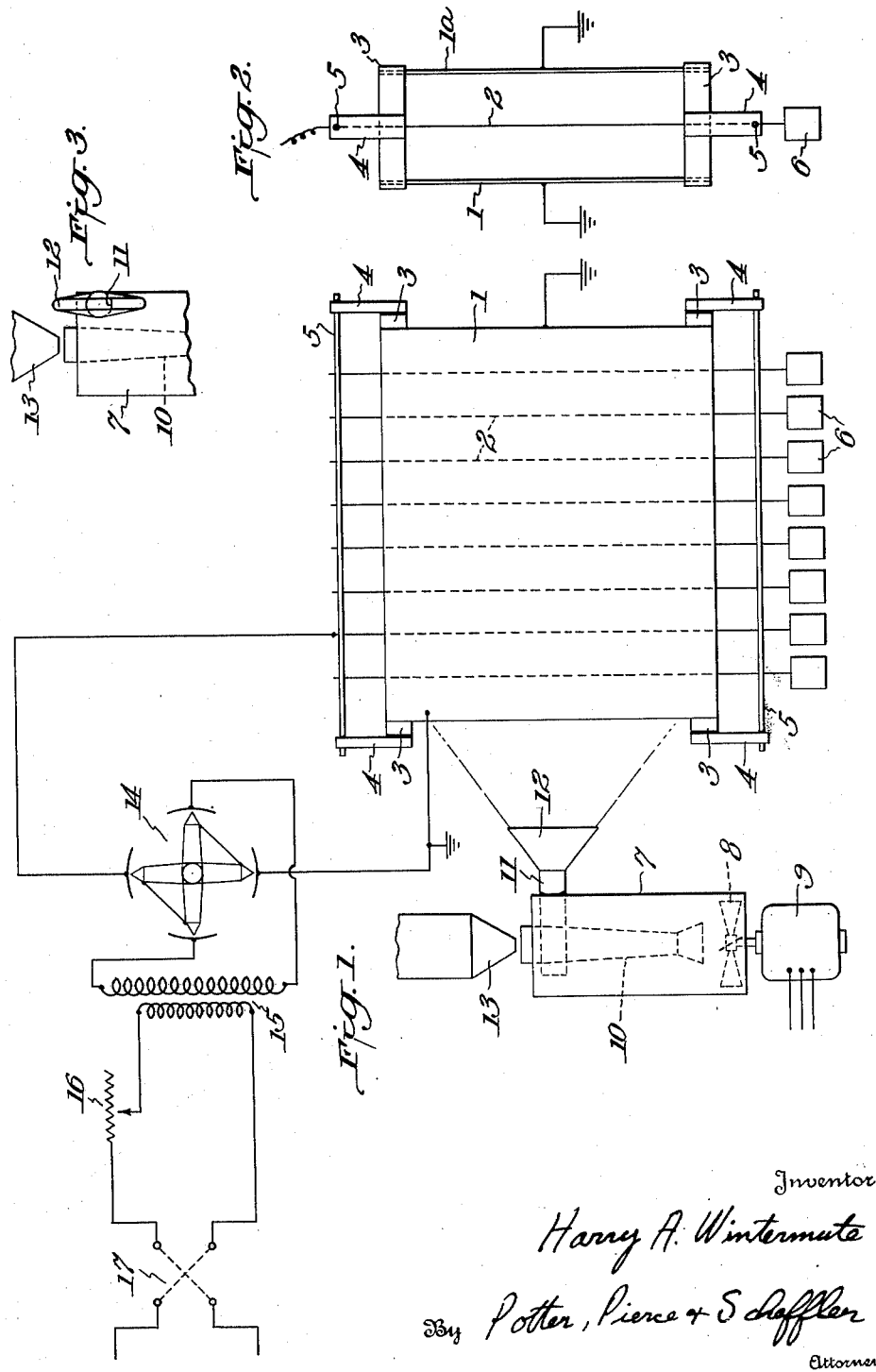

Patented July 18, 1939

2,166,385

UNITED STATES PATENT OFFICE 2,166,385

DETERMINING ELECTRICAL CHARACTERISTICS

Harry A. Wintermute, Plainfield, N. J., assignor, by mesne assignments, to Behr-Manning Corporation, a corporation of Massachusetts Application April 10, 1937, Serial No. 136,232

9 Claims. (Cl. 175—183)

This invention relates to a method of determining the electrical characteristics of finely divided materials, particularly fibrous materials of relatively high electrical resistance, for example, rayon flock, cotton fibers and the like.

It is particularly desirable in the utilization of finely divided fibrous materials to form piled surfaces by electrical deposition of the fibrous materials on a surface, to be able to determine in advance the electrical characteristics of the materials to be deposited, or to be able to determine the conditions, for example, of temperature and relative humidity at which a material exhibits the most favorable electrical characteristics for the purpose in hand.

A principal object of the invention is to provide a method for testing the electrical characteristics of finely divided materials.

A further object is to provide a method for the determination of the conditions under which the electrical characteristics of a material are at an optimum or have a predetermined value or are substantially equivalent to the electrical characteristics of a preselected standard material.

It has been found that these and other objects of the invention may be attained by causing a portion of the material to be tested to adhere to a surface under the influence of an electric charge imparted to the material and determining the rate at which the material loses the imparted charge.

An advantageous method of imparting a charge to the material comprises dispersing the material in air or other medium, and passing the dispersed material into an electrical field between a discharge member and a relatively extended surface whereby the material is deposited on the extended surface and a charge is imparted to the material.

The rate at which the imparted charge is lost may be determined by means of an electroscope or by determining the time required for the charge to fall to such a value that the deposited material will fall under the influence of gravity when the collecting surface is placed, for example, in a vertical position.

In the production of pile-surfaced materials by the deposition of finely divided fibrous materials, such as rayon flock, it has been found that in general the materials which exhibit a relatively high rate of leakage of the imparted charge are of particular value in the production of pile fabrics. It has also been found that materials showing similar rates of leakage are, in general, similar in their action in the production of piled surfaces. It has further been found that the rate of leakage and, correlative therewith, the satisfactoriness of deposition in the pile-forming process, may be varied by varying the condition of the material. The temperature and the relative humidity have been found to be of particular effect upon the rate of leakage of an imparted charge from finely divided material and the method of the invention provides an advantageous means for determining the optimum conditions, for example, of temperature and relative humidity under which the electrical deposition process may be carried out.

The invention will be more particularly described with reference to the accompanying drawing of an illustrative form of apparatus for use in practicing the invention.

In the drawing:

Fig. 1 is a partly diagrammatic elevation of apparatus suitable for practicing the invention;

Fig. 2 is an end elevation of the charging device of the apparatus of Fig. 1; and Fig. 3 is a fragmentary end elevation of the dispersing device of the apparatus of Fig. 1.

In the figures, 1 and 1a are vertical plate electrodes of conducting or semi-conducting material supported by members 3, and 2 are attenuated discharge electrodes carried by supporting members 5 mounted on insulators 4. The discharge electrodes are steadied by weights 6. The electrodes are energized by high voltage unidirectional current from mechanical rectifier 14 connected with the secondary of transformer 15. 16 is a resistance for voltage control and for ballasting the circuit and 17 is a reversing switch for controlling polarity of the charge.

The material to be tested is dispersed in a disperser 7, having a fan 8, driven by motor 9, for forming a current of air or other gas. The material is supplied from hopper 13 into tube 10 which carries the material to the bottom of the dispersing chamber and also forms an inlet for the current of air. The air current carrying the dispersed material passes out of tangential outlet 11, through the fan shaped nozzle 12 into the space between plates 1 and 1a.

In operation, the finely divided materials to be tested are broken up into individual particles and dispersed in the gas stream by means of the disperser 7. The gas stream leaves the disperser via the tangential outlet 11, entering the fan shaped nozzle 12. The gas carrying the finely dispersed particles leaves the nozzle 12 in a relatively narrow stream and enters the space between the two plates 1 and 1a. Here the particles are subjected to the influence of the electric fields between the discharge electrodes 2 and the conducting plate members 1 and 1a.

As the particles travel through the space between plates 1 and 1a the particles are charged by the electric field in which they find themselves principally by the corona discharge emanating from the discharge electrodes. The particles as they are charged move to the plates to which they cling as long as the plates and wires are energized. Operation is continued until a mat of fibers has been deposited on each plate varying from a few mils. up to a depth of an inch or more.

As long as the apparatus is energized, additional electric charge is supplied to the mat of fibers as fast as the charge on the fibers leaks off. However, as soon as the source of energy is disconnected the fibers begin to lose their charge by flow of current through the mat. The time required for the charge to leak off sufficiently for the mat to fall varies with the conductivity of the fibers. For high conductivity they may cling only a fraction of a second after the energy source is disconnected or for very low conductivity they may cling for several hours.

The charged particles attracted to the plate electrode are not repelled upon approaching the plate because the discharge from the discharge electrode furnishes additional charges of constant polarity to the particles as fast as the charges on the particles leak off to the plate. When the discharge electrode is disconnected from the source of energy, the particles will cling to the plate electrode for a long time if the paths over or through the particles and across their loose and limited contact with the surface of the plate are not sufficiently conducting to permit the charges on the particles to flow readily to the surface of the plate and be neutralized by the charges of opposite polarity thereon, and the rate at which a charge from the plate will flow out over the surfaces of the particles, bringing about a repelling action, will be very low when poorly conducting paths only are provided.

The opposing electrodes can be energized in numerous ways. However, for most cases satisfactory energization can be secured by means of a high voltage transformer and a synchronous mechanical rectifier connected between the transformer and the opposing electrodes.

Particles not charged are carried on through the duct and are not deposited on the plates. For best results, the gas carrying the finely divided material is fed into the space between the opposing electrodes in a stream relatively narrow with respect to the duct so that there will be no influence of the gas stream on the precipitated mat of fibers.

An illustrative example of a method of testing embodying the principles of the invention is as follows:

Forty grams of white celanese rayon flock were dispersed in air at a dry bulb temperature of 100° F. and a relative humidity of 32%. The dispersion was passed between two flat vertical plates about 45 inches long and 30 inches high spaced 7½ inches apart, having a plurality of wire discharge electrodes positioned midway between them. An electrical field was maintained by means of a unilateral potential of 50,000 volts impressed between the discharge electrodes and the plates. The voltage was maintained for several minutes after the material had deposited on the plates to insure uniformity of charging.

The time required for the deposited material to fall from the collecting plates was 72,840 seconds. When a further sample was deposited at the same temperautre and at a relative humidity of 67%, the deposited material fell from the collecting plates in 420 seconds.

A sample of white viscose rayon tested at a dry bulb temperature of 88° F. and a relative humidity of 65% fell from the collecting plates in 1 second.

While the invention has been more particularly described for the purpose of illustration, with reference to the testing of fibrous materials for use in the production of pile-surfaced materials, it is not limited thereto but may, in general, be advantageously applied when it is desired to determine the electrical characteristics of other finely divided materials of relatively low conductivity.

This application is a continuation-in-part of my application Serial No. 51,719, filed November 26, 1935.

I claim:

1. Method of testing finely divided fibrous materials which comprises causing a sample of the material to adhere to a surface by means of an electrical charge impressed thereon and determining the time required for the material to fall from the surface under the influence of gravity.

2. Method of testing finely divided fibrous material which comprises electrically depositing a sample of the material on a surface and determining the time required for the material to fall from the surface under the action of gravity.

3. Method of testing finely divided fibrous material which comprises electrically depositing a sample of the material on a surface and determining the conditions under which the material will fall from the surface under the action of gravity in a predetermined length of time.

4. Method of testing the electrical conductivity of finely divided materials of relatively low conductivity which comprises dispersing a sample of the material in a gaseous medium, impressing an electrical charge on the dispersed material, and determining the rate at which the dispersed charge is lost.

5. Method of measuring the effect upon finely divided materials of humidity and temperature conditions which comprises subjecting a sample of the material to predetermined conditions of humidity and temperature, causing the sample to adhere to a surface by means of an electrical charge impressed upon the sample and determining the rate at which the charge is transferred from the sample to the surface.

6. Method of testing the electrical characteristics of finely divided material of relatively low conductivity which comprises dispersing the material in a gaseous medium, electrically depositing the material on a surface by the action of an electric field, discontinuing the electric field, and determining the time required for the material to fall from the surface under the action of gravity.

7. Method of testing the electrical characteristics of finely divided materials of low conductivity which comprises subjecting the materials to a corona discharge to impress an electrical charge thereon and determining the rate at which the impressed charge is lost.

8. Method of testing the electrical characteristics of finely divided materials of low conductivity which comprises subjecting the materials to a corona discharge to impress an electrical charge thereon and determining the conditions of the atmosphere in contact therewith under which the impressed charge is lost at a predetermined rate.

9. Method of testing the electrical characteristics of finely divided materials of low conductivity which comprises subjecting said materials to a corona discharge in an electric field to cause the material to adhere to a surface, and determining the time required for adhesion of the material to the surface to be lost after discontinuance of the electric field.

HARRY A. WINTERMUTE.